(12) United States Patent
Jung et al.

(10) Patent No.: US 11,920,208 B2
(45) Date of Patent: Mar. 5, 2024

(54) HIGH STRENGTH AND HIGH FORMABILITY STEEL SHEET AND MANUFACTURING METHOD

(71) Applicant: ArcelorMittal, Luxembourg (LU)

(72) Inventors: Coralie Jung, Racrange (FR); Astrid Perlade, Le Ban-Saint-Martin (FR); Kangying Zhu, Metz (FR); Frédéric Kegel, Yutz (FR)

(73) Assignee: ARCELORMITTAL, Luxembourg (LU)

( * ) Notice: Subject to any disclaimer, the term of this patent is extended or adjusted under 35 U.S.C. 154(b) by 480 days.

(21) Appl. No.: 16/954,510

(22) PCT Filed: Dec. 18, 2018

(86) PCT No.: PCT/IB2018/060247
§ 371 (c)(1),
(2) Date: Jun. 16, 2020

(87) PCT Pub. No.: WO2019/123245
PCT Pub. Date: Jun. 27, 2019

(65) Prior Publication Data
US 2021/0087646 A1 Mar. 25, 2021

(30) Foreign Application Priority Data
Dec. 19, 2017 (WO) .................. PCT/IB2017/058122

(51) Int. Cl.
| | | |
|---|---|---|
| C21D 9/46 | (2006.01) | |
| B23K 11/16 | (2006.01) | |
| B32B 15/01 | (2006.01) | |
| C21D 6/00 | (2006.01) | |
| C21D 8/02 | (2006.01) | |
| C22C 38/00 | (2006.01) | |
| C22C 38/02 | (2006.01) | |
| C22C 38/06 | (2006.01) | |
| C22C 38/22 | (2006.01) | |
| C22C 38/24 | (2006.01) | |
| C22C 38/26 | (2006.01) | |
| C22C 38/28 | (2006.01) | |
| C22C 38/32 | (2006.01) | |
| C22C 38/38 | (2006.01) | |
| C23C 2/02 | (2006.01) | |
| C23C 2/06 | (2006.01) | |
| C23C 2/12 | (2006.01) | |
| C23C 2/28 | (2006.01) | |

(Continued)

(52) U.S. Cl.
CPC .............. *C21D 9/46* (2013.01); *B23K 11/16* (2013.01); *B32B 15/012* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/02* (2013.01); *C23C 2/0224* (2022.08); *C23C 2/06* (2013.01); *C23C 2/12* (2013.01); *C23C 2/29* (2022.08); *C23C 2/40* (2013.01); *B23K 2101/006* (2018.08); *C21D 2211/001* (2013.01); *C21D 2211/003* (2013.01); *C21D 2211/005* (2013.01); *C21D 2211/008* (2013.01)

(58) Field of Classification Search
CPC .. C21D 8/0226; C21D 8/0236; C21D 8/0263; C21D 2211/005; C21D 2211/003; C21D 2211/008; C11D 2211/001
See application file for complete search history.

(56) References Cited

U.S. PATENT DOCUMENTS

| | | | |
|---|---|---|---|
| 2014/0162088 A1 | 6/2014 | Kawata et al. | |
| 2014/0170440 A1* | 6/2014 | Kawata | C21D 8/0247 |
| | | | 148/330 |

(Continued)

FOREIGN PATENT DOCUMENTS

| | | |
|---|---|---|
| CN | 103797145 A | 5/2014 |
| CN | 104928568 A | 9/2015 |

(Continued)

OTHER PUBLICATIONS

Search Report of PCT/IB2018/060247.

*Primary Examiner* — Anthony M Liang
*Assistant Examiner* — Jacob J Gusewelle
(74) *Attorney, Agent, or Firm* — Davidson, Davidson & Kappel, LLC

(57) ABSTRACT

A cold-rolled and heat-treated steel sheet, has a composition comprising, by weight percent: n0.10%≤C≤0.25%, 3.5%≤Mn—≤6.0%, 0.5%≤Si≤2.0%, 0.3%≤Al≤1.2%, with Si+Al≥0.8%, 0.10%≤Mo≤0.50%, S≤0.010%, P≤0.020%, N≤0.008%. The cold-rolled steel sheet has a microstructure consisting of, in surface fraction: between 10% and 45% of ferrite, having an average grain size of at most 1.3 µm, the product of the surface fraction of ferrite by the average grain size of the ferrite being of at most 35 µm %, between 8% and 30% of retained austenite, the retained austenite having an Mn content higher than 1.1*Mn %, Mn % designating the Mn content of the steel, at most 8% of fresh martensite, at most 2.5% of cementite and partitioned martensite.

19 Claims, No Drawings

(51) Int. Cl.
*C23C 2/40* (2006.01)
*B23K 101/00* (2006.01)

(56) References Cited

U.S. PATENT DOCUMENTS

| | | |
|---|---|---|
| 2014/0230971 A1 | 8/2014 | Kawaski et al. |
| 2016/0194739 A1 | 7/2016 | Del Frate et al. |
| 2018/0030564 A1 | 2/2018 | Hasegawa |
| 2023/0050317 A1 | 2/2023 | Perlade et al. |

FOREIGN PATENT DOCUMENTS

| | | | |
|---|---|---|---|
| EP | 2757169 A1 | 7/2014 | |
| KR | 20160027105 A | 3/2016 | |
| KR | 20160035015 A | 3/2016 | |
| RU | 2556253 C1 | 7/2015 | |
| RU | 2557862 C1 | 7/2015 | |
| RU | 2575113 | 9/2015 | |
| WO | WO-2015011547 A2 * | 1/2015 | ........... B22D 11/001 |
| WO | WO2015011547 A2 | 1/2015 | |
| WO | WO2017108956 A1 | 6/2017 | |
| WO | WO2017108959 A1 | 6/2017 | |
| WO | WO-2017131053 A1 * | 8/2017 | ............. C21D 6/001 |

\* cited by examiner

HIGH STRENGTH AND HIGH FORMABILITY STEEL SHEET AND MANUFACTURING METHOD

The present invention relates to a method for producing a high strength steel sheet having high ductility and formability and to a sheet obtained with this method.

BACKGROUND

To manufacture various equipments such as parts of body structural members and body panels for automotive vehicles, it is known to use sheets made of DP (Dual Phase) steels or TRIP (Transformation Induced Plasticity) steels.

To reduce the weight of the automotive in order to improve their fuel efficiency in view of the global environmental conservation, it is desirable to have sheets having improved yield and tensile strengths. But such sheets must also have a good ductility and a good formability and more specifically a good stretch flangeability.

In order to solve this problem, it is known to produce sheets by a so-called quenching and partitioning process, wherein the sheets are cooled from an annealing temperature, down to a quenching temperature below the Ms transformation point, and thereafter heated to a partitioning temperature and maintained at this temperature for a given time. The resulting steel sheets have a structure comprising martensite and retained austenite, and optionally bainite and/or ferrite.

SUMMARY

However, it remains desirable to be able to produce a steel sheet or part having an improved combination of strength, ductility and formability.

Especially, it remains desirable to be able to produce a steel sheet having a yield strength YS comprised between 1000 MPa and 1300 MPa, a tensile strength TS comprised between 1200 MPa and 1600 MPa, a uniform elongation UE greater than or equal to 10%, a total elongation TE greater than or equal to 14%, a hole expansion ratio HER of at least 20% and a sum of the product of the yield strength YS by the uniform elongation UE (YS*UE), the product of the tensile strength TS by the total elongation TE (TS*TE), and the product of the tensile strength TS by the hole expansion ratio HER (TS×HER), YS*UE+TS*TE+TS*HER, of at least 56000 MPa %.

The yield strength YS, the tensile strength TS, the uniform elongation UE and the total elongation TE are measured according to ISO standard ISO 6892-1, published in October 2009. It must be emphasized that, due to differences in the methods of measurement, in particular due to differences in the geometries of the specimen used, the values of the total elongation TE according to the ISO standard are significantly different, and are in particular lower, than the values of the total elongation measured according to the JIS Z 2241 standard, using a specimen according to the JIS Z 2201-05 standard. The hole expansion ratio HER is measured according to ISO standard 16630:2009. Due to differences in the methods of measure, the values of the hole expansion ratio HER according to the ISO standard 16630:2009 are very different and not comparable to the values of the hole expansion ratio 2\, according to the JFS T 1001 (Japan Iron and Steel Federation standard).

For this purpose, a cold-rolled and heat-treated steel sheet is provided, made of a steel having a composition comprising, by weight percent:

0.10%≤C≤0.25%
3.5%≤Mn≤6.0%
0.5%≤Si≤2.0%
0.3%≤Al≤1.2%
with Si+Al≥0.8%
0.10%≤Mo≤0.50%
S≤0.010%
P≤0.020%
N≤0.008% and optionally one or more elements selected from amongst Cr, Ti, Nb, V and B, such that:
0.01%≤Cr≤1.0%
0.010%≤Ti≤0.080%
0.010%≤Nb≤0.080%
0.010%≤V≤0.30%
0.0005%≤B≤0.004%, the remainder of the composition being iron and unavoidable impurities resulting from the smelting, said cold-rolled steel sheet having a microstructure consisting of, in surface fraction:

between 10% and 45% of ferrite, having an average grain size of at most 1.3 μm, the product of the surface fraction of ferrite by the average grain size of the ferrite being of at most 35 μm %, between 8% and 30% of retained austenite, said retained austenite having an Mn content higher than 1.1*Mn %, Mn % designating the Mn content of the steel, at most 8% of fresh martensite, at most 2.5% of cementite and partitioned martensite.

Preferably, the retained austenite has an average C content of at least 0.4%.

In an embodiment, said fresh and partitioned martensite comprise carbides, the surface density of carbides whose surface area is higher than 10×60 nm$^2$ being lower than to 0.05*10$^6$/mm$^2$.

Preferably, the retained austenite is in the shape of islands, the islands of retained austenite having an average size lower than 500 nm.

In an embodiment, the structure comprises at most 0.3% of cementite, the cementite particles, if any, having an average size lower than 50 nm.

Generally, the cold-rolled and heat-treated steel sheet has a yield strength YS comprised between 1000 MPa and 1300 MPa, a tensile strength TS comprised between 1200 MPa and 1600 MPa, a uniform elongation UE of at least 10%, a total elongation TE, measured according to ISO standard ISO 6892-1, of at least 14%, a hole expansion ratio HER, measured according to the ISO standard 16630:2009, of at least 20%, and a sum of the product of the yield strength YS by the uniform elongation UE (YS*UE), the product of the tensile strength TS by the total elongation TE (TS*TE), and the product of the tensile strength TS by the hole expansion ratio HER (TS×HER), YS*UE+TS*TE+TS*HER, of at least 56000 MPa %.

In an embodiment, the cold-rolled and heat-treated steel sheet is coated with Zn or a Zn alloy.

In another embodiment, the cold-rolled and heat-treated steel sheet is coated with Al or a Al alloy.

Preferably, in the steel has a carbon equivalent Ceq lower than 0.4%, the carbon equivalent being defined as Ceq=C+Si %/55+Cr %/20+Mn %/19−Al %/18+2.2*P %−3.24*B %−0.133Mn %*Mo %.

A resistance spot welded joint of at least two steel sheets, wherein at least one of said two steel sheets is the cold-rolled and heat-treated steel sheet according to embodiments of the invention.

Preferably, the resistance spot welded joint has an alpha value, before any post welding heat treatment, of at least 50 daN/mm².

Preferably, the resistance spot welded joint has an alpha value of at least 70 daN/mm², especially after a post welding heat treatment.

A method for manufacturing a cold-rolled and heat-treated steel sheet, comprising the following successive steps:
casting a steel so as to obtain a slab, said steel having a composition comprising, by weight percent:
0.10%≤C≤0.25%
3.5%≤Mn≤6.0%
0.5%≤Si≤2.0%
0.3%≤Al≤1.2%
with Si+Al≥0.8%
0.10%≤Mo≤0.50%
S≤0.010%
P≤0.020%
N≤0.008%
and optionally one or more elements selected from amongst Cr, Ti, Nb, V and B, such that:
0.01%≤Cr≤1.0%
0.010%≤Ti≤0.080%
0.010%≤Nb≤0.080%
0.010%≤V≤0.30%
0.0005%≤B≤0.004%,
the remainder of the composition being iron and unavoidable impurities resulting from the smelting,
reheating the slab at a temperature $T_{reheat}$ comprised between 1150° C. and 1300° C.,
hot rolling the reheated slab at a temperature higher than Ar3 to obtain a hot rolled steel sheet,
coiling the hot rolled steel sheet at a coiling temperature $T_{coil}$ comprised between 20° C. and 600° C.,
annealing the hot rolled steel sheet at a first annealing temperature $T_{A1}$ comprised between 500° C. and $T_{A1max}$, $T_{A1max}$ being the temperature at which at most 30% of austenite is created upon heating, the hot-rolled steel sheet being maintained at said first annealing temperature $T_{A1}$ for a time $t_{A1}$ comprised between 3 s and 50000 s, to obtain a hot-rolled and annealed steel sheet,
cold rolling the hot-rolled and annealed steel sheet so as to obtain a cold rolled steel sheet,
reheating the cold-rolled steel sheet to a second annealing temperature $T_{A2}$ comprised between Ae1 and Ae3 and maintaining the cold-rolled steel sheet at the second annealing temperature $T_{A2}$ for a holding time to comprised between 30 s and 500 s, so as to obtain, upon annealing, a structure comprising between 55 and 90% of austenite and between 10% and 45% of ferrite,
quenching the cold-rolled steel sheet at a cooling rate Vc comprised between 1° C./s and 100° C./s, to a quenching temperature QT comprised between 20° C. and Ms−50° C.,
reheating the cold-rolled steel sheet to a partitioning temperature $T_P$ comprised between 350° C. and 500° C., and maintaining the cold-rolled steel sheet at said partitioning temperature $T_P$ for a partitioning time $t_P$ comprised between 3 s and 1000 s,
cooling the cold-rolled steel sheet to the room temperature, to obtain a cold-rolled and heat treated steel sheet.

Preferably, the hot-rolled and annealed steel sheet has a structure consisting of, in surface fraction:
at least 67% of ferrite, with an average grain size lower than 4 µm,
at most 30% of retained austenite,
at most 2% of fresh martensite, and
at most 3% of cementite.

In an embodiment, the cold-rolled and heat treated steel sheet has a microstructure consisting of, in surface fraction:
between 10% and 45% of ferrite, having an average grain size of at most 1.3 µm, the product of the surface fraction of ferrite by the average grain size of the ferrite being of at most 35 µm %,
between 8% and 30% of retained austenite, said retained austenite having an Mn content higher than 1.1*Mn %, Mn % designating the Mn content of the steel,
at most 8% of fresh martensite,
at most 2.5% of cementite and
partitioned martensite.

Generally, the retained austenite has an average C content of at least 0.4%.

In a first embodiment, the annealing performed on the hot-rolled steel sheet is a batch annealing, the first annealing temperature $T_{A1}$ being comprised between 500° C. and 670° C., the hot-rolled steel sheet being maintained at said first annealing temperature $T_{A1}$ for a time comprised between 1000 s and 50000 s.

In this embodiment, the hot-rolled and annealed steel sheet generally has a microstructure consisting of, in surface fraction:
at least 75% of ferrite with an average grain size lower than 4 µm,
at most 10% of retained austenite
at most 2% of fresh martensite, and
at most 3% of cementite,
said retained austenite having a Mn content higher than 1.5*Mn %, Mn % designating the Mn content of the steel.

In a second embodiment, the annealing performed on the hot-rolled steel sheet is a continuous annealing, the first annealing temperature $T_{A1}$ being comprised between 650° C. and a maximal continuous annealing temperature $T_{ICAmax}$, which is the temperature at which 30% of austenite is created upon heating, the hot-rolled steel sheet being maintained at said first annealing temperature $T_{A1}$ for a time comprised between 3 s and 500 s.

In this embodiment, the hot-rolled and annealed steel sheet generally has a structure consisting of, in surface fraction:
at least 67% of ferrite, with an average grain size lower than 4 µm,
at most 30% of austenite,
at most 2% of fresh martensite, and
at most 1% of cementite, the cementite particles, if any, having an average size lower than 150 nm.

The cold-rolled and heat treated steel sheet preferably has a microstructure consisting of, in surface fraction:
between 10% and 45% of ferrite, having an average grain size of at most 1.3 µm, the product of the surface fraction of ferrite by the average grain size of the ferrite being of at most 35 µm %,
between 8% and 30% of retained austenite, said retained austenite having an Mn content higher than 1.1*Mn %, Mn % designating the Mn content of the steel,
at most 8% of fresh martensite,
at most 0.3% of cementite, the cementite particles, if any, having an average size lower than 50 nm, and
partitioned martensite.

In an embodiment, between the maintaining at the partitioning temperature $T_P$ and the cooling to the room temperature, the cold-rolled steel sheet is hot-dip coated in a bath.

In another embodiment, after the maintaining of the cold-rolled sheet at the partitioning temperature $T_P$, the cold-rolled steel sheet is immediately cooled to the room temperature.

In this embodiment, after the step of cooling down the cold-rolled steel sheet to the room temperature, the cold-rolled and heat treated steel sheet may be coated by an electrochemical method or through a vacuum coating process.

In an embodiment, the cold-rolled and heat treated steel sheet is coated with Zn or a Zn alloy.

In another embodiment, the cold-rolled and heat-treated steel sheet is coated with Al or a Al alloy.

Preferably, the steel has a carbon equivalent Ceq lower than 0.4%, the carbon equivalent being defined as Ceq=C+Si %/55+Cr %/20+Mn %/19−Al %/18+2.2*P %−3.24*B %−0.133Mn %*Mo %.

A process for producing a spot welded joint of at least two steel sheets is also provided, comprising the steps of:
- providing a cold-rolled and heat-treated steel sheet according to embodiments of the invention or produced by a method according to embodiments of the invention,
- providing a second steel sheet,
- spot welding the cold-rolled and heat-treated steel sheet to the second steel sheet.

For example, the second steel sheet is a cold-rolled and heat-treated steel sheet according to embodiments of the invention or produced by a method according to embodiments of the invention.

DETAILED DESCRIPTION

The invention will now be described in details and illustrated by examples without introducing limitations.

Hereinafter, Ae1 designates the equilibrium transformation temperature below which austenite is completely unstable, Ae3 designates the equilibrium transformation temperature above which austenite is completely stable, Ar3 designates the temperature at which the transformation of austenite to ferrite begins upon cooling, Ms designates the martensite start temperature, i.e. the temperature at which the austenite begins to transform into martensite upon cooling, and Mf designates the martensite finish temperature, i.e. the temperature at which the transformation from austenite to martensite finishes upon cooling. For a given steel, one skilled in the art knows how to determine these temperatures through dilatometry tests.

The composition of the steel according to the present disclosure comprises, by weight percent:
- 0.10%≤C≤0.25% for ensuring a satisfactory strength and improving the stability of the retained austenite which is necessary to obtain a sufficient elongation. Preferably, the carbon content is higher than or equal to 0.15%. If the carbon content is too high, the hot rolled sheet is too hard to cold roll and the weldability is insufficient. If the carbon content is below 0.10%, the tensile strength will not reach the targeted values.
- 3.5%≤Mn≤6.0% for ensuring a satisfactory strength and achieving stabilization of at least part of the austenite, to obtain a sufficient elongation. Especially, the minimum is defined to obtain a final structure comprising, in surface fraction, between 8% and 30% retained austenite, having a Mn content higher than 1.1*Mn %, Mn % designating the Mn content of the steel. Below 3.5%, the final structure comprises an insufficient retained austenite fraction, and an insufficient Mn content in the retained austenite, so that the desired combination of ductility and strength is not achieved. The maximum is defined to avoid having segregation issues which are detrimental for the ductility. Preferably, the manganese content is higher than or equal to 3.7%.
- 0.5%≤Si≤2.0% and 0.3%≤Al≤1.2%, the silicon and aluminum contents further satisfying the following relationship: Si+Al≥0.8%.

According to the present disclosure Si and Al together play an important role: silicon delays the precipitation of cementite upon cooling below the equilibrium transformation temperature Ae3. Therefore, a Si addition helps to stabilize a sufficient amount of retained austenite. Si further provides solid solution strengthening and retards the formation of carbides during carbon redistribution from martensite to austenite resulting from an immediate reheating and holding step performed after a partial martensitic transformation. At a too high content, silicon oxides form at the surface, which impairs the coatability of the steel. Therefore, the Si content is less than or equal to 2.0%.

Aluminum is a very effective element for deoxidizing the steel in the liquid phase during elaboration. In addition, Al is a gammageneous element that increases the Ae1 and Ae3 temperatures of the steel. Thus, owing to the addition of at least 0.3% of Al, the intercritical domain (i.e. between Ae1 and Ae3) is in a temperature range favoring the partitioning of Mn in the austenite, as described in further details below. The Al content is not higher than 1.2% in order to avoid the occurrence of inclusions, to avoid oxidation problems and to ensure the hardenability of the material.

Furthermore, like Si, Al stabilizes the retained austenite. The effects of Si and Al on the stabilization of the retained austenite are similar. When the Si and Al contents are such that Si+Al≥0.8%, satisfactory stabilization of the austenite is obtained, thereby making it possible to achieve the desired microstructures.

- 0.10%≤Mo≤0.50%. Molybdenum increases the hardenability, stabilizes the retained austenite thus reducing austenite decomposition during partitioning, and reduces the central segregation which can result from the high manganese content and which is detrimental to the hole expansion ratio. Furthermore, Mo helps refining the structure. Above 0.50%, the addition of Mo is costly and ineffective in view of the properties which are sought after.
- Optionally 0.01%≤Cr≤1.0% to delay the dissolution of carbides and stabilize the retained austenite. A maximum of 1.0% of chromium is allowed, above a saturation effect is noted, and adding Cr is both useless and expensive.
- Optionally 0.010%≤Nb≤0.080%, in order to refine the austenite grains during hot-rolling and to provide precipitation strengthening. A niobium content of 0.010% to 0.080% makes it possible to obtain satisfactory yield strength, elongation and hole expansion ratio. Above 0.080%, the ductility and the hole expansion ratio are not satisfactory.
- Optionally 0.010%≤Ti≤0.080%. Especially, titanium may be added in a content between 0.010% and 0.080% in addition to boron to protect boron against the formation of BN.

The Nb and Ti contents are each not higher than 0.080% in order to limit the hardening of the steel at high temperatures provided by these elements, which would make it difficult to produce thin plates due to increase of hot rolling forces.

Optionally, 0.010%≤V≤0.30% in order to provide precipitation strengthening. If the vanadium content is above 0.30%, vanadium will consume the carbon by forming carbides and/or carbonitrides and this will soften the martensite. In addition, the ductility of the steel according to the present disclosure will be impaired.

Optionally 0.0005%≤B≤0.004%, in order to increase the quenchability of the steel.

The remainder of the composition of the steel is iron and impurities resulting from the smelting. In this respect, Ni, Cu, S, P and N at least are considered as residual elements which are unavoidable impurities. Therefore, their contents are less than 0.05% for Ni, 0.03% for Cu, 0.010% for S, 0.020% for P and 0.008% for N.

Preferably, the composition of the steel is such that the steel has a carbon equivalent Ceq lower than 0.4%, the carbon equivalent being defined as Ceq=C+Si %/55+Cr %/20+Mn %/19−Al %/18+2.2*P %−3.24*B %−0.133Mn %*Mo %.

With a carbon equivalent lower than 0.4%, the spot weldability of the steel sheet is very good. In addition, in spite of the low contents of addition elements required for achieving a carbon equivalent lower than 0.4%, the steel sheet of the present disclosure and its manufacturing method allow achieving very high mechanical properties.

Thus, according to the present disclosure, very high mechanical properties and a very good spot weldability can be achieved.

The microstructure of the cold-rolled and heat-treated steel sheet according to the present disclosure will be now described.

The cold-rolled and heat-treated steel sheet has a structure consisting of, in surface fraction:
 between 10% and 45% of ferrite, having an average grain size of at most 1.3 µm, the product of the surface fraction of ferrite by the average grain size of the ferrite being of at most 35 µm %,
 between 8% and 30% of retained austenite, said retained austenite having an average Mn content higher than 1.1*Mn %, Mn % designating the Mn content of the steel,
 at most 8% of fresh martensite,
 at most 2.5% of cementite and
 partitioned martensite.

These surface fractions and grain size are determined through the following method: a specimen is cut from the cold-rolled and heat-treated, polished and etched with a reagent known per se, so as to reveal the microstructure. The section is afterwards examined through optical or scanning electron microscope, for example with a Scanning Electron Microscope with a Field Emission Gun ("FEG-SEM") at a magnification greater than 5000×, coupled to an Electron Backscatter Diffraction ("EBSD") device and to a Transmission Electron Microscopy (TEM).

The determination of the surface fraction of each constituent (partitioned martensite, fresh martensite, ferrite and austenite) are performed with image analysis through a method known per se. The retained austenite fraction is for example determined by X-ray diffraction (XRD).

The ferrite in the structure is intercritical ferrite.

If the ferrite fraction is lower than 10%, the hole expansion ratio HER does not reach 20%. If the ferrite fraction is higher than 45%, a tensile strength of at least 1200 MPa is not achieved.

The ferrite has an average grain size of at most 1.3 µm. In addition, the product of the surface fraction of ferrite, expressed in %, and the average size of the ferrite grains, expressed in µm, is of at most 35 µm %.

The average grain size of at most 1.3 µm and the product of the surface fraction of ferrite and the average grain size of the ferrite grains of at most 35 µm % make it possible to achieve a hole expansion ratio HER of at least 20%, a yield strength of at least 1000 MPa and a sum YS*UE+TS*TE+TS*HER of at least 56000 MPa %.

The microstructure of the cold-rolled and heat-treated steel sheet includes at least 8% of austenite which is, at room temperature, retained austenite. When present in surface fraction of at least 8%, retained austenite contributes to increasing ductility.

The retained austenite is enriched in manganese. Especially, the retained austenite has an average Mn content higher than or equal to 1.1*Mn %, wherein Mn designates the Mn content in the steel composition. This enrichment in Mn stabilizes the retained austenite.

The retained austenite is also generally enriched in carbon. Especially, the retained austenite has an average C content of at least 0.4%, preferably comprised between 0.4% and 1.0%. This enrichment in C further stabilizes the austenite.

The C content in the retained austenite is for example determined by determining the retained austenite fraction and the lattice parameters by an X-ray diffraction (XRD) analysis, with a Rietveld refinement (Rietveld, H., "A profile refinement method for nuclear and magnetic structures", Journal of applied Crystallography, 2(2), 65-71, 1969). The C content in the retained austenite is then determined by using the Dyson and Holmes formulae (D. J. Dyson, and B. Holmes: "Effect of alloying additions on the lattice parameter austenite", Journal of the Iron and Steel Institute, 1970, 208, 469-474).

The retained austenite is generally in the shape of islands, the average size of the islands of retained austenite being lower than 500 nm.

A surface fraction of at least 8% of retained austenite, having a Mn content higher than 1.1*Mn %, allows obtaining a combination of high ductility and high strength.

Indeed, the enrichment of the retained austenite with Mn provides a high stabilization of the austenite, so that when the steel sheet is subjected to a deformation, the retained austenite deforms by both glide of individual dislocations and mechanical twinning.

The structure may comprise up to 2.5% of cementite. In an embodiment, the structure comprises at most 1%, and still preferably at most 0.3% of cementite.

The average size of the cementite particles in the final structure is generally lower than 50 nm.

Partitioned martensite is present as fine elongated laths, oriented within the prior austenite grains. The partitioned martensite has an average C content strictly lower than the nominal C content of the steel.

Fresh martensite may be present in the structure, with a surface fraction however of at most 8%. Indeed, a fraction of fresh martensite higher than 8% would lead to a hole expansion ratio HER according to ISO 16630:2009 lower than 20%.

Partitioned martensite can be distinguished from fresh martensite on a section polished and etched with a reagent known per se, for example Nital reagent, observed by Scanning Electron Microscopy (SEM) and Electron Backscatter Diffraction (EBSD).

The martensite, including partitioned martensite and fresh martensite, if any, comprises a small amount of carbides. Especially, the surface density of carbides in the martensite whose surface area is higher than 10×60 nm² is generally lower than or equal to 0.05*10⁶/mm².

A method for producing a cold-rolled and heat-treated steel sheet as described above will now be disclosed.

Hot rolled sheet having a thickness between 2 and 6 mm can be produced by casting a steel having a composition as mentioned above so as to obtain a slab, reheating the slab at a temperature $T_{reheat}$ comprised between 1150° C. and 1300° C., and hot rolling the reheated slab, the final rolling temperature being higher than Ar3, to obtain a hot rolled steel.

The final rolling temperature is preferably of at most 1000° C., in order to avoid coarsening of the austenitic grains.

The hot-rolled steel is then cooled, at a cooling rate for example comprised between 1° C./s and 50° C./s, and coiled at a temperature comprised between 20° C. and 600° C.

After the coiling, the sheet has a structure which may comprise bainite, martensite, and retained austenite.

After the coiling, the sheet is pickled.

The hot-rolled steel sheet is then annealed, in order to improve the cold-rollability and the toughness of the hot-rolled steel sheet, and in order to provide a hot-rolled and annealed steel sheet which is suitable for producing a cold-rolled and heat-treated steel sheet having high mechanical properties, in particular a high strength and a high ductility.

Especially, the hot-rolled steel sheet is annealed at a first annealing temperature $T_{A1}$ and for a first annealing time $t_{A1}$ controlled so as to obtain a structure, at the end of this first annealing, consisting of, in surface fraction:
  at least 67% of ferrite, with an average size lower than 4 µm,
  at most 30% of retained austenite,
  at most 2% of fresh martensite, and
  at most 3% of cementite.

Having at least 67% of ferrite, with an average ferritic grain size of at most 4 µm allows producing a cold-rolled and heat-treated steel sheet having a very fine structure, and therefore very high mechanical properties.

A fresh martensite fraction of at most 2% make it possible to achieve a high toughness of the hot-rolled and annealed steel sheet.

In addition, a cementite fraction of at most 3% implies that cementite dissolution is facilitated during the subsequent annealing of the cold-rolled steel sheet, therefore improving ductility and strength during the further processing steps.

The inventors have found this structure is achieved if the annealing of the hot-rolled steel sheet is performed at a first annealing temperature $T_{A1}$ comprised between 500° C. and $T_{A1max}$, $T_{A1max}$ being the temperature at which at most 30% of austenite is created upon heating, and during a first annealing time $t_{A1}$ comprised between 3 s and 50000 s. The first annealing time $t_{A1}$ is the holding time at the first annealing temperature $T_{A1}$, and does not include the heating time to this first annealing temperature $T_{A1}$.

If the first annealing temperature $T_{A1}$ is lower than 500° C. and/or the first annealing time $t_{A1}$ is lower than 3 s, softening through microstructure recovery is insufficient, so that the hardness of the hot-rolled and annealed steel sheet will be too high, resulting in a poor cold-rollability of the sheet.

If the first annealing temperature $T_{A1}$ is higher than $T_{A1max}$, a too high austenite fraction will be created during the first annealing, so that the fraction of fresh martensite in the hot-rolled and annealed steel sheet will be higher than 2%, and the fraction of retained austenite in the hot-rolled and annealed steel sheet may be higher than 30%.

If the first annealing time $t_{A1}$ is higher than 50000 s, the microstructure is coarsened, so that the average ferritic grain size in the hot-rolled and annealed steel sheet is higher than 4 µm.

The austenite which can be created during the first annealing is enriched in Mn, especially has an average Mn content of at least 1.5*Mn %. This enrichment in Mn results from manganese partitioning to the austenite during the holding at the first annealing temperature $T_{A1}$. Therefore, this austenite is stabilized, so that the structure of the hot-rolled and annealed steel sheet comprises up to 30% of retained austenite, generally having an average Mn content higher than 1.5*Mn %, and comprises at most 2% of fresh martensite.

In a first embodiment, the first annealing is a batch annealing.

In this embodiment, the first annealing is preferably performed so as to obtain a structure of the hot-rolled and annealed steel sheet consisting of, in surface fraction:
  at least 75% of ferrite, with an average size lower than 4 µm,
  at most 10% of retained austenite,
  at most 2% of fresh martensite, and
  at most 3% of cementite,
the retained austenite having an average Mn content higher than 1.5*Mn %, Mn % designating the Mn content in the steel.

The inventors have found that such structure is achieved if the first annealing temperature $T_{A1}$ is comprised between 500° C. and 670° C., and the first annealing time $t_{A1}$ is comprised between 1000 s and 50000 s.

The first annealing temperature $T_{A1}$ is lower than 670° C. in order to limit the coarsening of the structure. Above 670° C., an average ferritic grain size higher than 4 µm will be obtained in the hot-rolled and annealed steel sheet.

In the first embodiment, the first annealing time $t_{A1}$ is of at least 1000 s, so as to achieve sufficient softening. Below 1000 s, the hardness of the hot-rolled and annealed steel sheet will be too high, resulting in a poor cold-rollability of the sheet.

In the first embodiment, the austenite which can be created during the first annealing is enriched in Mn, especially has an average Mn content of at least 1.5*Mn %. This enrichment in Mn results from manganese partitioning to the austenite during the holding at the first annealing temperature $T_{A1}$.

Therefore, this austenite is stabilized, so that the structure of the hot-rolled and annealed steel sheet comprises up to 10% of retained austenite, having an average Mn content higher than 1.5*Mn %, and comprises at most 2% of fresh martensite.

In a second embodiment, the first annealing is a continuous annealing.

In this second embodiment, the first annealing is preferably performed so as to obtain a structure of the hot-rolled and annealed steel sheet consisting of, in surface fraction:
  at least 67% of ferrite, with an average size lower than 4 µm,
  at most 30% of retained austenite,
  at most 2% of fresh martensite,
  at most 1% of cementite,
the cementite particles, if any, having an average size lower than 150 nm.

In this second embodiment, the first annealing temperature $T_{A1}$ is preferably comprised between 650° C. and a maximal continuous annealing temperature $T_{ICAmax}$, being the temperature at which 30% of austenite is created upon heating.

Besides, the first annealing time $t_{A1}$ is comprised between 3 s and 500 s.

If the first annealing temperature $T_{A1}$ is lower than 650° C., softening through microstructure is insufficient, so that the hardness of the hot-rolled and annealed steel sheet will be too high, resulting in a poor cold-rollability of the sheet.

If the first annealing temperature $T_{A1}$ is higher than $T_{ICAmax}$, a too high fraction of austenite will be created during continuous annealing, which may result in an insufficient stabilization of the austenite, so that the fraction of fresh martensite in the hot-rolled and annealed steel sheet will be higher than 2%.

Besides, in the second embodiment, if the first annealing time $t_{A1}$ is higher than 500 s, the microstructure is coarsened, so that the average ferritic grain size in the hot-rolled and annealed steel sheet is higher than 4 µm.

In this second embodiment, the austenite which can be created during the first annealing is also enriched in Mn, especially has a Mn content of at least 1.5*Mn %.

Thus, this austenite is strongly stabilized, so that at most 2% of fresh martensite will be created upon cooling. The retained austenite in the hot-rolled and annealed steel sheet therefore generally has an average Mn content of at least 1.5*Mn %.

The hot-rolled and annealed steel sheet is then optionally pickled.

The hot-rolled and annealed steel sheet is then cold-rolled to obtain a cold rolled steel sheet having a thickness between 0.7 mm and 3 mm, for example in the range of 0.8 mm to 2 mm.

The cold-rolling reduction ratio is preferably comprised between 20% and 80%. Below 20%, the recrystallization during subsequent heat-treatment is not favored, which may impair the ductility of the cold-rolled and heat-treated steel sheet. Above 80%, there is a risk of edge cracking during cold-rolling.

The cold-rolled steel sheet is then heat treated on a continuous annealing line.

The heat treatment comprises the steps of:
reheating the cold-rolled steel sheet to a second annealing temperature $T_{A2}$ comprised between Ae1 and Ae3 so as to obtain, upon annealing, a structure comprising between 55% and 90% of austenite and between 10% and 45% of ferrite, and maintaining the cold-rolled steel sheet at the second annealing temperature $T_{A2}$ for a holding time $t_{A2}$.

One skilled in the art knows how to determine Ae1 and Ae3 and the second annealing temperature $T_{A2}$ suitable for achieving the desired structure upon annealing for each steel composition, from dilatometry tests.

The reheating rate Vr to the second annealing temperature $T_{A2}$ is preferably comprised between 1° C./s and 200° C./s.

During this annealing, the cementite which may be present in the structure is dissolved.

Especially, owing to the Al contents in the steel composition, the annealing temperature for achieving upon annealing a structure comprising between 55% and 90% of austenite and between 10% and 45% of ferrite, is in a temperature range favouring the dissolution of carbides.

This temperature range also favours the partitioning of Mn into the austenite during the holding at this temperature.

After the holding of the sheet at the second annealing temperature, the structure of the steel sheet therefore consists of 55% to 90% of austenite, enriched in Mn, and 10% to 45% of ferrite.

If the second annealing temperature is such that the structure obtained upon annealing contains less than 10% of ferrite, the ferrite fraction in the final structure is insufficient for achieving the desired elongation and hole expansion ratio. In addition, the enrichment of austenite with Mn is insufficient to stabilize the retained austenite.

If the second annealing temperature is such that the structure obtained upon annealing contains more than 45% of ferrite, the ferrite fraction in the final structure is too high to achieve the desired tensile strength. In addition, the dissolution of carbides is insufficient, resulting in a coarsening of the final structure, especially to an average grain size of the ferrite higher than 1.3 µm and a product of the surface fraction of ferrite and the average grain size of the ferrite grains higher than 35 µm %.

The holding time $t_{A2}$ at the second annealing temperature $T_{A2}$ is comprised between 30 s and 500 s.

If the holding time $t_{A2}$ is of less than 30 s, an insufficient stabilization of the austenite with Mn and an insufficient carbides dissolution are achieved. A holding time $t_{A2}$ longer than 500 s would lead to a coarsening of the structure. Especially, a holding time $t_{A2}$ longer than 500 s would lead to an average grain size of the ferrite higher than 1.3 µm and a product of the surface fraction of ferrite and the average grain size of the ferrite grains higher than 35 µm %, so that the targeted properties, especially the targeted hole expansion ratio, yield strength and sum YS*UE+TS*TE+TS× HER would not be achieved.

quenching the cold-rolled steel sheet at a cooling rate Vc comprised between 1° C./s and 100° C./s to avoid the formation of pearlite upon cooling, to a quenching temperature QT lower than the Ms transformation point of the austenite. The quenching temperature QT is comprised between 20° C. and Ms−50° C. For each particular composition of the steel and each structure, one skilled in the art knows how to determine the Ms start transformation point of the austenite by dilatometry. The temperature of 20° C. is generally higher than Mf+20° C.

During this quenching step, the austenite partly transforms into martensite.

The quenching temperature QT is preferably selected so as to obtain, just after quenching, a structure consisting of between 8% and 38% of austenite, between 10% and 45% of ferrite, 12% to 82% of martensite and possibly cementite.

One skilled in the art knows how to determine the quenching temperature adapted to obtain a desired structure.

If the quenching temperature QT is lower than 20° C., the fraction of partitioned martensite in the final structure is too high to stabilize a sufficient amount of retained austenite above 8%. Besides, if the quenching temperature QT is higher than Ms−50° C., the fraction of partitioned martensite in the final structure is too low to obtain the desired tensile strength.

optionally holding the quenched sheet at the quenching temperature QT for a holding time $t_Q$ comprised between 2 s and 200 s, preferably between 3 s and 7 s, so as to avoid the formation of epsilon carbides in martensite, that would result in a decrease in the elongation of the steel.

reheating the cold-rolled steel sheet to a partitioning temperature $T_P$ comprised between 350° C. and 500° C., and maintaining the cold-rolled steel sheet at the partitioning temperature $T_P$ for a partitioning time $t_P$ comprised between 3 s and 1000 s.

During this partitioning step, the carbon diffuses from the martensite to the austenite, thereby achieving an enrichment in C of the austenite.

If the partitioning temperature $T_P$ is higher than 500° C. or lower than 350° C., the elongation of the final product is not satisfactory.

optionally hot-dip coating the sheet in a bath at a temperature for example lower than or equal to 480° C. Any kind of coatings can be used and in particular, zinc or zinc alloys, like zinc-nickel, zinc-magnesium or

- zinc-magnesium-aluminum alloys, aluminum or aluminum alloys, for example aluminum-silicium.
- immediately after the partitioning step, or immediately after the hot-dip coating step, if performed, cooling the cold-rolled steel sheet to the room temperature, to obtain a cold-rolled and heat treated steel sheet. The cooling rate is preferably higher than 1° C./s, for example comprised between 2° C./s and 20° C./s.

During this cooling step, part of the austenite may transform into fresh martensite. However, the surface fraction of the fresh martensite remains lower than or equal to 8%, owing to the stabilization of austenite with C and Mn.

- optionally, after cooling down to the room temperature, if the hot-dip coating step has not been performed, the sheet can be coated by electrochemical methods, for example electro-galvanizing, or through any vacuum coating process, like PVD or Jet Vapor Deposition. Any kind of coatings can be used and in particular, zinc or zinc alloys, like zinc-nickel, zinc-magnesium or zinc-magnesium-aluminum alloys. Optionally, after coating by electro-galvanizing, the sheet may be subjected to degassing.
- optionally, after cooling down to the room temperature and optional coating, the sheet may be subjected to an additional tempering treatment, at a temperature comprised between 150° C. and 450° C., for a holding time comprised between 1 and 20 minutes (the higher the temperature, the lower the holding time). This tempering treatment is destined to improve the formability of the sheet.

This manufacturing method allows obtaining a final structure i.e. after partitioning and cooling to the room temperature, consisting of, in surface fraction:
- between 10% and 45% of ferrite,
- 8% and 30% of retained austenite,
- at most 8% of fresh martensite,
- partitioned martensite, and
- at most 2.5% of cementite.

The ferrite is intercritical ferrite.

The presence of intercritical ferrite in the structure, rather than ferrite which could have been created during the cooling below the second annealing temperature $T_{A2}$, (hereinafter transformation ferrite) makes it possible to achieve Mn enrichment of the austenite during this second annealing. Indeed, the presence of transformation ferrite rather than intercritical ferrite would imply that a sufficient stabilization of the retained austenite with Mn could not take place during the second annealing, so that the desired properties, especially the desired total elongation, would not be achieved.

The ferrite has an average grain size of at most 1.3 µm. In addition, the product of the surface fraction of ferrite, expressed in %, and the average size of the ferrite grains, expressed in um, is of at most 35 µm %.

This average grain size results from the fine structure of the hot-rolled and annealed steel sheet, and from the subsequent heat-treatment, especially the deformation of the sheet during cold-rolling and subsequent recrystallization.

The retained austenite is enriched in Mn, this enrichment resulting especially from the partitioning of the Mn from the ferrite to the austenite during the holding at the second annealing temperature $T_{A2}$. Especially, this enrichment in Mn results from the fact that the intercritical annealing at $T_{A2}$ is performed in a temperature range favoring the diffusion of Mn from the ferrite to the austenite The Mn content in the retained austenite is therefore higher than 1.1*Mn %.

The retained austenite is generally enriched in C, this enrichment resulting from the partitioning of carbon from the martensite to the austenite during the holding at the partitioning temperature $T_P$.

The average C content in the retained austenite is generally of at least 0.4%, preferably comprised between 0.4% and 1.0%.

The retained austenite is in the shape of islands, the average size of the islands of retained austenite being lower than 500 nm.

Partitioned martensite is created upon cooling below the Ms transformation temperature after the second annealing, and subsequent heating and holding at a partitioning temperature $T_P$ comprised between 350° C. and 500° C.

The partitioned martensite has an average C content strictly lower than the nominal C content of the steel. This low C content results from the partitioning of carbon from the martensite, created upon quenching below the Ms temperature of the steel, to the austenite, during the holding at the partitioning temperature $T_P$.

Fresh martensite may create upon cooling from the partitioning temperature $T_P$ to room temperature. However, owing to the stabilization of the retained austenite with Mn, the fraction of fresh martensite in the structure is lower than or equal to 8%.

The martensite, including partitioned martensite and fresh martensite, if any, comprises a small amount of carbides. Especially, the surface density of carbides in the martensite whose surface area is higher than 10×60 nm² is generally lower than or equal to $0.05*10^6/mm^2$.

This small amount of carbides in martensite results from the partitioning of C from the martensite to the austenite during the holding at the partitioning temperature $T_P$. This small amount of carbides contributes to obtaining a high combination of tensile strength and total elongation.

Indeed, the smaller the amount of carbides, the lower the fraction of carbon and manganese under the form of carbides, and the higher the fraction of carbon and manganese in austenite. By contrast, a surface density of carbides in the martensite whose surface area is higher than 10×60 nm² higher than $0.05*10^6/mm^2$ would imply that the austenite does not contain sufficient amounts of carbon and manganese and is not sufficiently stabilized.

A small fraction of cementite may be created upon cooling from the annealing temperature and during partitioning. However, the cementite fraction in the final structure will in any case remain lower than 2.5%. Generally, the cementite fraction in the final structure is lower than 1%, and preferably lower than 0.3%.

In addition, the average size of the cementite particles in the final structure is generally lower than 150 nm.

If the first annealing is a continuous annealing, the final structure comprises at most 0.3% of cementite, the cementite particles, if any, having an average size lower than 50 nm. Indeed, the continuous annealing results in the creation of a very low fraction of cementite, the hot-rolled and annealed steel sheet having a cementite fraction of at most 1%. In addition, the cementite particles are very fine, the average particle size being of at most 150 nm. Therefore, the cementite entirely or almost entirely dissolves during the subsequent annealing at the second annealing temperature.

Steel sheets having a yield strength YS comprised between 1000 MPa and 1300 MPa, a tensile strength TS comprised between 1200 MPa and 1600 MPa, a uniform elongation UE greater than or equal to 10%, a total elongation TE greater than or equal to 14%, a hole expansion ratio HER of at least 20% and a sum of the product of the yield strength YS by the uniform elongation UE (YS*UE), the product of the tensile strength TS by the total elongation TE (TS*TE), and the product of the tensile strength TS by the hole expansion ratio HER (TS×HER), YS*UE+TS*TE+TS*HER, of at least 56000 MPa % are obtained. Generally, the product yield strength×uniform elongation (YS×UE) is of at least 11000 MPa % and the product tensile strength× total elongation (TS×TE) is of at least 19000 MPa %.

Another object of the present disclosure is a welded assembly comprising a first steel sheet and a second steel sheet welded together by resistance spot welding. The first steel sheet is a cold-rolled and heat-treated steel sheet according to the present disclosure, and the second steel sheet may be according to the present disclosure or have a different composition. Especially, the first and second steel sheets may have the same compositions or different compositions, and the same thickness or different thicknesses.

The welded assembly is manufactured by producing the first and second steel sheets, and resistance spot welding the first and second steel sheets.

The resistance spot welds joining the first steel sheet to the second steel sheet are characterized by a high resistance in cross-tensile test defined by an alpha value of at least 50 daN/mm$^2$, and preferably of at least 70 daN/mm$^2$, especially after a post-weld heat treatment.

Here, the alpha value designates the maximum load in cross test divided by the weld diameter and the thickness. It is a normalized load for resistant spot welding expressed in daN/mm$^2$.

EXAMPLES

As examples and comparison, sheets made of steels compositions according to table I, have been manufactured, the contents being expressed by weight percent.

In this Table, "res." means that the element is only present as a residual, and that no voluntary addition of this element was made.

The transformation temperatures of the steels Ae1 and Ae3 and were measured by dilatometry, and are also reported in Table I.

In this table, the underlined values are not according to the invention.

TABLE I

| Steel | C (%) | Mn (%) | Si (%) | Al (%) | Si + Al (%) | Mo (%) | S (%) | P (%) | N (%) | Cr (%) | Ti (%) | Nb (%) | V (%) | B (%) | Ceq | Ae1 (° C.) | Ae3 (° C.) |
|---|---|---|---|---|---|---|---|---|---|---|---|---|---|---|---|---|---|
| I1 | 0.146 | 3.78 | 1.46 | 0.79 | 2.25 | 0.187 | 0.001 | 0.009 | 0.004 | res. | res. | 0.058 | res. | res. | 0.25 | 650 | 900 |
| I2 | 0.174 | 3.8 | 1.52 | 0.757 | 2.277 | 0.201 | 0.0015 | 0.013 | 0.008 | res. | res. | 0.03 | res. | res. | 0.29 | 650 | 900 |
| I3 | 0.188 | 4.04 | 1.19 | 0.781 | 1.971 | 0.2 | 0.0012 | 0.013 | 0.0047 | 0.505 | 0.04 | 0.022 | res. | 0.0022 | 0.25 | 640 | 890 |
| I4 | 0.184 | 3.72 | 1.2 | 0.79 | 1.99 | 0.2 | 0.001 | 0.013 | 0.0036 | res. | res | 0.032 | res. | 0.0006 | 0.29 | 640 | 900 |
| R1 | 0.152 | 3.65 | 1.58 | 0.003 | 1.583 | res. | 0.0008 | 0.009 | 0.004 | res. | 0.045 | res. | 0.106 | res. | 0.39 | 640 | 780 |
| R2 | 0.157 | 3.52 | 1.52 | 0.028 | 1.548 | res. | 0.0008 | 0.01 | 0.002 | res. | res. | 0.057 | res. | res. | 0.39 | 640 | 780 |
| R3 | 0.145 | 3.82 | 1.47 | 0.79 | 2.26 | res. | 0.001 | 0.009 | 0.005 | res. | res. | 0.058 | res. | res. | 0.35 | 650 | 900 |
| R4 | 0.146 | 3.86 | 1.48 | 0.028 | 1.508 | res. | 0.001 | 0.009 | 0.004 | res. | res. | 0.06 | res. | res. | 0.39 | 640 | 780 |
| R5 | 0.113 | 4.75 | 0.5 | 1.45 | 1.95 | res. | 0.001 | 0.012 | 0.004 | res. | res. | 0.03 | res. | res. | 0.32 | 600 | 950 |

The steels were cast so as to obtain ingots. The ingots were reheated at a temperature $T_{reheat}$ of 1250° C., hot-rolled at a temperature higher than Ar3 to obtain a hot rolled steel, and pickled.

The hot-rolled steels were then coiled at a temperature $T_{coil}$ of 450° C. or 20° C., batch annealed or continuously annealed at a first annealing temperature $T_{A1}$ for a time $t_{A1}$, thereby obtaining hot-rolled and annealed steel sheets.

Microstructural analyses were performed on specimens taken from the hot-rolled and annealed steel sheets.

The hot-rolled and annealed steel sheets were then pickled and cold-rolled with a cold-rolling reduction ratio of 50%, to obtain cold-rolled sheets having a thickness of 1.2 mm.

The cold-rolled sheets were reheated to a second annealing temperature $T_{A2}$ at a heating rate Vr=10° C./s and maintained at the second annealing temperature $T_{A2}$ for a holding time $t_{A2}$.

The cold-rolled sheets were then quenched at a cooling rate Vc=5° C./s to a quenching temperature QT and maintained at the temperature QT for a time $t_Q$=3 s.

The sheets were then reheated to a partitioning temperature $T_P$ and maintained at the partitioning temperature $T_P$ for a partitioning time $t_P$, then immediately cooled to the room temperature.

The conditions of treatment are reported in Table II.

In this Table, the column "Annealing type" indicates whether the annealing performed was a batch annealing or a continuous annealing.

TABLE II

| Ex. | Steel | Tcoil (° C.) | Annealing type | $T_{A1}$ (° C.) | $t_{A1}$ (s) | $T_{A2}$ (° C.) | $t_{A2}$ (s) | Ms (° C.) | QT (° C.) | $T_P$ (° C.) | $t_P$ (s) |
|---|---|---|---|---|---|---|---|---|---|---|---|
| I1A | I1 | 450 | batch | 600 | 18000 | 840 | 100 | 255 | 130 | 400 | 220 |
| I1B | I1 | 450 | batch | 600 | 18000 | 840 | 100 | 255 | 110 | 400 | 220 |
| I1C | I1 | 450 | batch | 600 | 18000 | 870 | 100 | 283 | 140 | 400 | 220 |

TABLE II-continued

| Ex. | Steel | Tcoil (° C.) | Annealing type | $T_{A1}$ (° C.) | $t_{A1}$ (s) | $T_{A2}$ (° C.) | $t_{A2}$ (s) | Ms (° C.) | QT (° C.) | $T_P$ (° C.) | $t_P$ (s) |
|---|---|---|---|---|---|---|---|---|---|---|---|
| I1D | I1 | 450 | batch | 600 | 18000 | 870 | 100 | 283 | 120 | 400 | 220 |
| I1E | I1 | 450 | batch | 600 | 18000 | 900 | 200 | 337 | 215 | 400 | 220 |
| I2A | I2 | 450 | batch | 600 | 18000 | 810 | 200 | 230 | 110 | 400 | 220 |
| I2B | I2 | 450 | batch | 600 | 18000 | 840 | 100 | 285 | 140 | 400 | 220 |
| I2C | I2 | 450 | batch | 650 | 21600 | 870 | 100 | 300 | 180 | 400 | 220 |
| I3A | I3 | 450 | batch | 665 | 21600 | 840 | 120 | 285 | 150 | 450 | 220 |
| I3B | I3 | 450 | batch | 600 | 21600 | 840 | 120 | 290 | 150 | 425 | 220 |
| I3C | I3 | 20 | continuous | 700 | 600 | 770 | 120 | 200 | 40 | 450 | 220 |
| I3D | I3 | 20 | continuous | 700 | 600 | 830 | 120 | 280 | 130 | 450 | 220 |
| I4A | I4 | 450 | batch | 650 | 18000 | 840 | 100 | 290 | 140 | 400 | 220 |
| I4B | I4 | 450 | batch | 680 | 18000 | 840 | 100 | 290 | 140 | 400 | 220 |
| R1A | R1 | 450 | batch | 600 | 21600 | 775 | 200 | 265 | 140 | 400 | 230 |
| R2A | R2 | 450 | batch | 600 | 21600 | 775 | 200 | 270 | 120 | 400 | 230 |
| R2B | R2 | 450 | batch | 600 | 21600 | 775 | 200 | 270 | 140 | 400 | 230 |
| R3A | R3 | 450 | batch | 600 | 21600 | 840 | 100 | 260 | 140 | 400 | 220 |
| R3B | R3 | 450 | batch | 600 | 21600 | 870 | 100 | 320 | 150 | 400 | 220 |
| R4A | R4 | 450 | batch | 600 | 21600 | 775 | 100 | 250 | 160 | 450 | 100 |
| R4B | R4 | 450 | batch | 600 | 21600 | 775 | 200 | 250 | 120 | 400 | 230 |
| R5A | R5 | 450 | batch | 600 | 21600 | 830 | 200 | 210 | 120 | 400 | 220 |
| R5B | R5 | 450 | batch | 600 | 21600 | 860 | 200 | 260 | 150 | 400 | 220 |

In Table II, the underlined values are not according to the invention.

The microstructures of the hot-rolled and annealed steel sheets are reported in Table III.

TABLE III

| Steel | Fα (%) | Dα (μm) | Fγ (%) |
|---|---|---|---|
| I1A | 98 | 1.5 | <2 |
| I1B | 98 | 1.5 | <2 |
| I1C | 98 | 1.5 | <2 |
| I1D | 98 | 1.5 | <2 |
| I1E | 98 | 1.5 | <2 |
| I2A | 98 | 1.5 | <2 |
| I2B | 98 | 1.5 | <2 |
| I2C | 96 | 2.5 | 2 |
| I3A | 85 | 3.5 | 5 |
| I3B | 98 | 1.5 | <2 |
| I3C | 92 | 0.4 | 7 |
| I3D | 92 | 0.1 | 7 |
| I4A | 94 | 3 | 5 |
| I4B | 90 | 6 | 10 |
| R1A | 98 | 1.5 | <2 |
| R2A | 98 | 1.5 | <2 |
| R2B | 98 | 1.5 | <2 |
| R3A | 98 | 1.5 | <2 |
| R3B | 98 | 1.5 | <2 |
| R4A | 98 | 1.5 | <2 |
| R4B | 98 | 1.5 | <2 |
| R5A | 98 | 1.5 | <2 |
| R5B | 98 | 1.5 | <2 |

In Table III, Fγ is the surface fraction of austenite, expressed by percent, Fα is the surface fraction of ferrite, expressed by percent, and Da is the average size of ferrite grains, in micrometers.

The microstructures of the cold-rolled and heat-treated steel sheets were analyzed by observation with a Scanning Electron Microscope with a Field Emission Gun ("FEG-SEM") at a magnification greater than 5000×, coupled to an Electron Backscatter Diffraction ("EBSD") device and to a Transmission Electron Microscopy (TEM).

The microstructures of the cold-rolled and heat-treated steel sheets are reported in Table IV. In this Table:

Fγ designates the surface fraction of retained austenite, in percentage,

Dγ is the average size of the islands of retained austenite, expressed in nm,

Fα designates the surface fraction of ferrite, expressed by percent,

Dα is the average grain size of the ferrite, in μm,

Fα*Dα is the product of the surface fraction of ferrite in %, by the average size of the ferrite in μm, FM is the surface fraction of fresh martensite, expressed by percent, PM is the surface fraction of partitioned martensite, expressed by percent, $d_c$ is the surface density of carbides in martensite having a surface area greater than 10×60 nm², expressed in $10^6/mm^2$.

TABLE IV

| Steel | Fγ (%) | Dγ (nm) | Fα (%) | Dα (μm) | Fα*Dα (μm %) | FM (%) | PM (%) | $d_C$ (×10⁶/mm²) |
|---|---|---|---|---|---|---|---|---|
| I1A | 15 | 400 | 33 | 0.8 | 26.4 | 6 | 46 | 0 |
| I1B | 12 | 380 | 33 | 0.8 | 26.4 | 3 | 52 | 0 |
| I1C | 10 | 350 | 25 | 1 | 25 | 6 | 59 | 0 |
| I1D | 9 | 350 | 25 | 1 | 25 | 4 | 62 | 0 |
| I1E | 8.2 | 450 | 0 | NA | NA | 10 | 81.8 | 5 |
| I2A | 25 | 450 | 44 | 0.6 | 26.4 | 2 | 29 | 0 |
| I2B | 18 | 350 | 32 | 0.8 | 25.6 | 3 | 47 | 0 |
| I2C | 14 | 500 | 24 | 1.2 | 28.8 | 6 | 56 | 0 |
| I3A | 13 | 500 | 25 | 1.2 | 30 | 7 | 55 | 0 |
| I3B | 15 | 400 | 23 | 0.6 | 13.8 | 5 | 57 | 0 |
| I3C | 25 | 250 | 42 | 0.5 | 21 | 2 | 31 | 0 |
| I3D | 17 | 300 | 15 | 0.7 | 10.5 | 2 | 66 | 0 |
| I4A | 16 | 400 | 28 | 1.2 | 33.6 | 2 | 54 | 0 |
| I4B | 17 | 500 | 30 | 2 | 60 | 3 | 50 | 0 |
| R1A | 18 | 480 | 6 | 0.5 | 3 | 10 | 66 | 0.05 |
| R2A | 16 | 450 | 7 | 0.5 | 3.5 | 5 | 72 | 0.05 |
| R2B | 19 | 480 | 7 | 0.5 | 3.5 | 10 | 64 | 0.05 |
| R3A | 13 | 700 | 35 | 3 | 105 | 8 | 44 | 0 |
| R3B | 11 | 800 | 25 | 2.8 | 70 | 6 | 58 | 0 |
| R4A | 15 | 500 | 6 | 0.5 | 3 | 12 | 67 | 0.05 |
| R4B | 15 | 450 | 6 | 0.5 | 3 | 7 | 72 | 0.05 |
| R5A | 15 | 600 | 50 | 1 | 50 | 8 | 27 | 0 |
| R5B | 12 | 600 | 40 | 1.3 | 52 | 6 | 42 | 0 |

In this Table, the underlined values are not according to the invention. "n.d." means "not determined" and "NA" means "not applicable".

In addition, the average Mn content in the retained austenite of examples I1A to I1D and I2A to I4A was determined. All these examples have an average Mn content higher than 1.1*Mn %.

The cementite fraction for these examples I1A to I1D and I2A to I4A is lower than 2.5%.

The mechanical properties of the cold-rolled and heat-treated steel sheets were also determined. Especially, the yield strength YS, the tensile strength TS, the uniform elongation UE and the total elongation TE were measured according to the ISO standard ISO 6892-1, published in October 2009. The hole expansion ratio HER was measured according to the standard ISO 16630:2009.

The mechanical properties are reported in Table V.

TABLE V

|  | YS (MPa) | TS (MPa) | UE (%) | TE (%) | HER (%) | YS × UE (MPa %) | TS × TE (MPa %) | TS × HER (MPa %) | YS*UE + TS*TE + TS*HER (MPa %) |
|---|---|---|---|---|---|---|---|---|---|
| I1A | 1015 | 1327 | 12.6 | 16.1 | 21 | 12789 | 21365 | 27867 | 62021 |
| I1B | 1082 | 1302 | 12.4 | 16.4 | 28 | 13417 | 21353 | 36456 | 71226 |
| I1C | 1154 | 1287 | 10.8 | 14.5 | 31.3 | 12463 | 18662 | 40283 | 71408 |
| I1D | 1181 | 1309 | 10.4 | 14.7 | 36 | 12282 | 19242 | 47124 | 78649 |
| I1E | 1126 | 1303 | _9.5_ | _13.2_ | n.d. | 10697 | 17199.6 | n.d. | n.d. |
| I2A | 1000 | 1286 | _11.8_ | _14.9_ | 25 | 11800 | 19161 | 32150 | 63111 |
| I2B | 1074 | 1320 | 11.6 | 15.9 | 24 | 12458 | 20988 | 31680 | 65126 |
| I2C | 1049 | 1292 | 10.3 | 14 | 22 | 10805 | 18088 | 28424 | 57317 |
| I3A | 1008 | 1329 | 11.8 | 15.2 | 23 | 11894 | 20201 | 30567 | 62662 |
| I3B | 1245 | 1369 | 10.7 | 14.4 | 28 | 13321.5 | 19713.6 | 38332 | 71367 |
| I3C | 1098 | 1290 | 12.3 | 15.4 | n.d. | 13505.4 | 19866 | n.d. | n.d. |
| I3D | 1246 | 1356 | 11.6 | 14.3 | 26 | 14453.6 | 19390.8 | 35256 | 69100 |
| I4A | 1039 | 1270 | 10.1 | 14.1 | 33.2 | 10493.9 | 17907 | 42164 | 70565 |
| I4B | _862_ | 1213 | 11.5 | 15.6 | 23 | 9913 | 18922.8 | 27899 | 56735 |
| _R1A_ | _940_ | 1334 | 10.5 | 13.8 | _13.9_ | 9870 | 18409 | 18543 | 46822 |
| _R2A_ | 1028 | 1305 | 11.5 | _14.5_ | _18.5_ | 11822 | 18923 | 24143 | _54887_ |
| _R2B_ | _898_ | 1313 | 11.4 | 14.5 | _13.6_ | 10237 | 19039 | 17857 | _47133_ |
| _R3A_ | _734_ | 1148 | 12.4 | 16.8 | n.d. | 9102 | 19286 | n.d. | n.d. |
| _R3B_ | _956_ | _1160_ | 12 | 16.5 | n.d. | 11472 | 19140 | n.d. | n.d. |
| _R4A_ | _758_ | 1399 | 10.3 | 12.8 | _10.5_ | 7807 | 17907 | 14690 | 40404 |
| _R4B_ | 1012 | 1326 | 12.4 | _15.6_ | _14_ | 12549 | 20686 | 18564 | _51798_ |
| _R5A_ | _815_ | 1130 | 8.8 | 11.7 | _14.2_ | 7172 | 13221 | 16046 | _36439_ |
| _R5B_ | _960_ | _1169_ | 10.2 | _14_ | _24_ | 9792 | 16366 | 28056 | _54214_ |

In this Table, the underlined values are not according to the invention. "n.d." means "not determined".

Examples I1A-I1D and I2A-I4A were made from steels according to embodiments of the invention, and were produced by a manufacturing method according to embodiments of the invention. All these examples have yield strength YS comprised between 1000 MPa and 1300 MPa, a tensile strength TS comprised between 1200 MPa and 1600 MPa, a uniform elongation UE of at least 10%, a total elongation TE measured according to ISO standard ISO 6892-1, of at least 14%, a hole expansion ratio HER, measured according to the ISO standard 16630:2009, of at least 20%, and a sum YS*UE+TS*TE+TS*HER higher than 56000 MP a %.

By contrast, example I1E, though being made of a steel having a composition according to embodiments of the invention, was subjected to a second annealing at a second annealing temperature equal to Ae3. As a result, the final structure of the cold-rolled and heat-treated steel sheet comprises no ferrite, so that the targeted uniform and total elongations are not achieved.

Example I4B was also made of a steel having a composition according to embodiments of the invention, but was batch annealed at a temperature of 680° C. As a consequence, the ferrite grain size of the hot-rolled steel sheet after batch annealing is higher than 4 μm. The cold-rolled and heat-treated steel sheet therefore has a structure wherein the average grain size of the ferrite is higher than 1.3 μm and the product Fα*Dα of the surface fraction of ferrite in by the average size of the ferrite in nm is higher than 35 μm %. As a result, the yield strength of example I4B is lower than 1000 MPa.

Besides, examples R1A, R2B and R4A were produced from steels comprising less than 0.3% of Al and less than 0.1% of Mo. As a consequence, the temperature Ae3 of these steels was too low to allow performing the second annealing in a temperature range favoring the enrichment of the austenite with Mn, whilst creating a structure, upon annealing, comprising 10% to 45% of ferrite and 55% to 90% of austenite. Therefore, even though the steel was annealed with a second annealing temperature $T_{A2}$ of 775° C., i.e. lower than the second annealing temperatures of the examples according to embodiments of the invention, the structure comprised more than 90% of austenite and less than 10% of ferrite upon annealing, so that the final structure contains less than 10% of ferrite.

In addition, this second annealing temperature $T_{A2}$ of 775° C. was not even sufficient to allow significant diffusion of Mn to the austenite. Owing to the high austenite fraction created upon annealing and to the low diffusion of Mn to this austenite, the austenite was not sufficiently enriched in Mn during the second annealing. As a result, the final structures of examples R1A, R2B and R4A comprise more than 8% of fresh martensite.

Owing to the too low ferrite fraction and too high fresh martensite fraction, the yield strengths YS of examples R1A, R2B and R4A are lower than 1000 MPa and their hole expansion ratios HER are lower than 20%. In addition, the total elongations TE of examples R1A and R4A do not reach 14%.

Example R2A was produced with the same conditions as example R2B, except for the quenching temperature, which was lower for example R2A (120° C.) than for example R2B (140° C.). As a consequence, example R2A comprises more partitioned martensite and less than 8% of fresh martensite. Nevertheless, the ferrite fraction remains lower than 10%, so that a hole expansion ratio HER lower than 20% and a sum YS*UE+TS*TE+TS*HER lower than 56,000 MPa % are achieved.

Examples R3A and R3B were produced from a steel comprising no Mo. As a consequence, the ferrite grain size in the final structure is higher than 1.3 μm, and the tensile strength does not reach 1200 MPa.

Example R4B was produced from a steel comprising less than 0.3% of Al and less than 0.1% of Mo. As a consequence, the temperature Ae3 of this steel was too low to allow performing the second annealing in a temperature range favoring the enrichment of the austenite with Mn, whilst creating a structure, upon annealing, comprising 10% to 45% of ferrite and 55% to 90% of austenite. Therefore, even though the steel was annealed with a second annealing temperature $T_{A2}$ of 775° C., i.e. lower than the second annealing temperatures of the examples according to embodiments of the invention, the structure comprised more than 90% of austenite and less than 10% of ferrite upon annealing, so that the final structure contains less than 10% of ferrite.

Owing to the too low ferrite fraction, the hole expansion ratio HER of example R4B is lower than 20%.

Examples R5A and R5B were produced from a steel comprising more than 1.0% of Al and no Mo.

Example R5A was annealed at 830° C., so that the final structure contains more than 45% of ferrite. In addition, owing to the absence of Mo in the steel, the product of the surface fraction of ferrite, by the average grain size of the ferrite is higher than 35 μm %. As a consequence, none of the targeted properties is achieved.

R5B was annealed at a higher second annealing temperature (860° C.), so that the final structure contains less than 45% of ferrite. However, the product of the surface fraction of ferrite, by the average grain size of the ferrite remains higher than 35 μm %. As a consequence, the targeted tensile and yield strengths are not achieved, and the sum YS*UE+TS*TE+TS*HER remains lower than 56,000 MPa %.

Besides, the inventors assessed the weldability of the steel sheets obtained with the manufacturing conditions described above.

Especially, resistance spot welding tests was performed on some of the steel sheets. Cold-rolled and heat-treated steel sheets produced under various test conditions were resistance spot welded with a welding force of 400 daN.

Cross-tensile tests were performed and the alpha value was determined.

Here, the alpha value designates the maximum load in cross test divided by the weld diameter and the thickness. It is a normalized load for resistant spot welding expressed in daN/mm².

The parameters and results are reported in Table VI, wherein:

"Test condition" designates the cold-rolled and heat-treated steel sheet on which the resistance spot welding test was performed, "alpha" designates the alpha value, i.e. the maximum load in cross test divided by the weld diameter and the thickness, expressed in daN/mm².

TABLE VI

| Test condition | Alpha (daN/mm²) |
| --- | --- |
| I1B | 81 |
| I2B | 75 |
| I3B | 51 |
| I4A | 75 |
| R1A | 49 |
| R2A | 49 |
| R3A | 70 |

TABLE VI-continued

| Test condition | Alpha (daN/mm²) |
| --- | --- |
| R4A | 48 |
| R5A | 85 |

The examples I1B, I2B, I3B and I4A are made of steels having a composition according to embodiments of the invention, and were produced with manufacturing conditions corresponding to embodiments of the invention. As a consequence, the resistance spot welds produced by resistance spot welding these sheets have a high ductility, characterized by an alpha value of at least 50 daN/mm² before any post-weld heat treatment.

The cold-rolled and heat-treated steel sheets according to embodiments of the invention and manufactured according to embodiments of the invention can be used with profit for the fabrication of structural or safety parts of vehicles.

The invention claimed is:

1. A method for manufacturing a cold-rolled and heat-treated steel sheet, comprising the following successive steps:
    casting a steel so as to obtain a slab, the steel having a composition comprising, by weight percent:
        $0.10\% \leq C \leq 0.25\%$,
        $3.5\% \leq Mn \leq 6.0\%$,
        $0.5\% \leq Si \leq 2.0\%$,
        $0.3\% \leq Al \leq 1.2\%$,
        with $Si+Al \geq 0.8\%$,
        $0.10\% \leq Mo \leq 0.50\%$,
        $S \leq 0.010\%$,
        $P \leq 0.020\%$,
        $N \leq 0.008\%$,
    and optionally one or more elements selected from a group consisting of Cr, Ti, Nb, V and B, such that by weight percent:
        $0.01\% \leq Cr \leq 1.0\%$,
        $0.010\% \leq Ti \leq 0.080\%$,
        $0.010\% \leq Nb \leq 0.080\%$,
        $0.010\% \leq V \leq 0.30\%$,
        $0.0005\% \leq B \leq 0.004\%$,
    a remainder of the composition being iron and unavoidable impurities resulting from the smelting;
    reheating the slab at a temperature $T_{reheat}$ comprised between 1150° C. and 1300° C.;
    hot rolling the reheated slab at a temperature higher than Ar3 to obtain a hot rolled steel sheet;
    coiling the hot rolled steel sheet at a coiling temperature $T_{coil}$ comprised between 20° C. and 600° C.;
    annealing the hot rolled steel sheet at a first annealing temperature $T_{A1}$ comprised between 500° C. and $T_{A1max}$, $T_{A1max}$ being the temperature at which at most 30% of austenite is created upon heating, the hot-rolled steel sheet being maintained at the first annealing temperature $T_{A1}$ for a time tai comprised between 3 s and 50000 s, to obtain a hot-rolled and annealed steel sheet;
    cold rolling the hot-rolled and annealed steel sheet so as to obtain a cold rolled steel sheet;
    reheating the cold-rolled steel sheet to a second annealing temperature $T_{A2}$ comprised between 770° C. and Ae3 and maintaining the cold-rolled steel sheet at the second annealing temperature $T_{A2}$ for a holding time to comprised between 30 s and 500 s, so as to obtain, upon annealing, a structure comprising between 55 and 90% of austenite and between 10% and 45% of ferrite;

quenching the cold-rolled steel sheet at a cooling rate Vc comprised between 1° C./s and 100° C./s, to a quenching temperature QT comprised between 20° C. and Ms−50° C.;

reheating the cold-rolled steel sheet to a partitioning temperature $T_P$ comprised between 350° C. and 500° C., and maintaining the cold-rolled steel sheet at a partitioning temperature $T_P$ for a partitioning time $t_p$ comprised between 3 s and 1000 s; and cooling the cold-rolled steel sheet to a room temperature, to obtain a cold-rolled and heat treated steel sheet, wherein the cold-rolled and heat-treated steel sheet has a total elongation TE, measured according to ISO standard ISO 6892-1, of at least 14% and a hole expansion ratio HER, measured according to the ISO standard 16630:2009, of at least 20%.

2. The method according to claim 1, wherein the hot-rolled and annealed steel sheet has a structure consisting of, in surface fraction:
- at least 67% of ferrite, with an average grain size lower than 4 um,
- at most 30% of retained austenite,
- at most 2% of fresh martensite, and
- at most 3% of cementite.

3. The method according to claim 1, wherein the cold-rolled and heat treated steel sheet has a microstructure consisting of, in surface fraction:
- between 10% and 45% of ferrite, the ferrite having an average grain size of at most 1.3 um, the product of the surface fraction of ferrite by the average grain size of the ferrite being of at most 35 μm %,
- between 8% and 30% of retained austenite, the retained austenite having an Mn content higher than 1.1*Mn %, Mn % designating the Mn content of the steel,
- at most 8% of fresh martensite,
- at most 2.5% of cementite, and
- partitioned martensite.

4. The method according to claim 3, wherein the retained austenite has an average C content of at least 0.4%.

5. The method according to claim 1, wherein the annealing performed on the hot-rolled steel sheet is a batch annealing, the first annealing temperature $T_{A1}$ being comprised between 500° C. and 670° C., the hot-rolled steel sheet being maintained at the first annealing temperature $T_{A1}$ for a time comprised between 1000 s and 50000 s.

6. The method according to claim 5, wherein the hot-rolled and annealed steel sheet has a microstructure consisting of, in surface fraction:
- at least 75% of ferrite with an average grain size lower than 4 μm,
- at most 10% of retained austenite,
- at most 2% of fresh martensite, and
- at most 3% of cementite,
- the retained austenite having a Mn content higher than 1.5*Mn %, Mn % designating the Mn content of the steel.

7. The method according to claim 1, wherein the annealing performed on the hot-rolled steel sheet is a continuous annealing, the first annealing temperature Tai being comprised between 650° C. and a maximal continuous annealing temperature $T_{ICAmax}$, the maximal continuous annealing temperature $T_{ICAmax}$ being the temperature at which 30% of austenite is created upon heating, the hot-rolled steel sheet being maintained at the first annealing temperature $T_{A1}$ for a time comprised between 3 s and 500 s.

8. The method according to claim 7, wherein the hot-rolled and annealed steel sheet has a structure consisting of, in surface fraction:
- at least 67% of ferrite, the ferrite having an average grain size lower than 4 μm,
- at most 30% of austenite,
- at most 2% of fresh martensite, and
- at most 1% of cementite, the cementite particles, if any, having an average size lower than 150 nm.

9. The method according to claim 7, wherein the cold-rolled and heat treated steel sheet has a microstructure consisting of, in surface fraction:
- between 10% and 45% of ferrite, the ferrite having an average grain size of at most 1.3 μm, a product of the surface fraction of the ferrite by the average grain size of the ferrite being of at most 35 μm %,
- between 8% and 30% of retained austenite, the retained austenite having an Mn content higher than 1.1*Mn %, Mn % designating the Mn content of the steel,
- at most 8% of fresh martensite,
- at most 0.3% of cementite, particles of the cementite, if any, having an average size lower than 50 nm, and
- partitioned martensite.

10. The method according to claim 1, wherein, between the maintaining at the partitioning temperature $T_p$ and the cooling to the room temperature, the cold-rolled steel sheet is hot-dip coated in a bath.

11. The method according to claim 1, wherein, after the maintaining of the cold-rolled sheet at the partitioning temperature $T_P$, the cold-rolled steel sheet is immediately cooled to the room temperature.

12. The method according to claim 11, wherein after the step of cooling down the cold-rolled steel sheet to the room temperature, the cold-rolled and heat treated steel sheet is coated by an electrochemical method or through a vacuum coating process.

13. The method according to claim 10, wherein the cold-rolled and heat treated steel sheet is coated with Zn or a Zn alloy.

14. The method according to claim 10, wherein the cold-rolled and heat-treated steel sheet is coated with Al or a Al alloy.

15. The method according to claim 1, wherein the steel has a carbon equivalent Ceq lower than 0.4%, the carbon equivalent being defined as Ceq=C+Si %/55+Cr %/20+Mn %/19−Al %/18+2.2*P %−3.24*B %−0.133Mn %*Mo %.

16. A process for producing a spot welded joint of at least two steel sheets, comprising the steps of:
- performing the method according to claim 1 to produce a cold-rolled and heat-treated steel sheet;
- providing a second steel sheet; and
- spot welding the cold-rolled and heat-treated steel sheet to the second steel sheet.

17. A process for producing a spot welded joint of at least two steel sheets, comprising the steps of:
- performing the method according to claim 1 to produce two cold-rolled and heat-treated steel sheets; and
- spot welding the two cold-rolled and heat-treated steel sheets together.

18. The method according to claim 1, wherein the cold-rolled and heat-treated steel sheet has a microstructure comprising at least 29% partitioned martensite.

19. The method according to claim 1, wherein the cold-rolled and heat-treated steel sheet has a yield strength YS of at least 1000 MPa.

* * * * *